Oct. 11, 1932.   C. BRYKCZYNSKI ET AL   1,882,238
DELIVERY AND LOADING MEANS FOR BAKERY PRODUCTS OR THE LIKE.
Filed Sept. 11, 1931   2 Sheets-Sheet 1
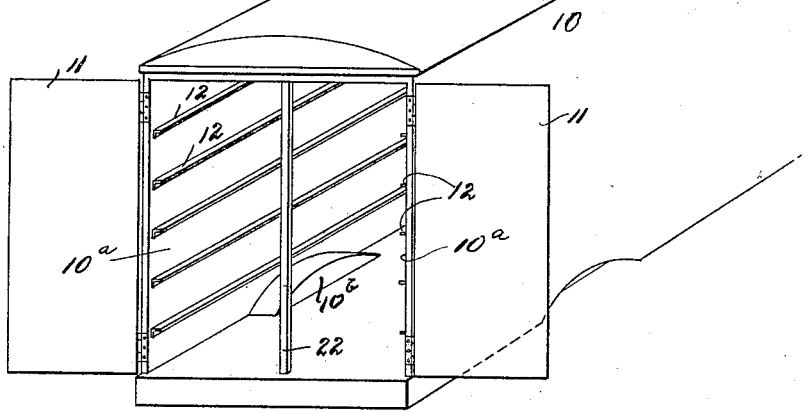
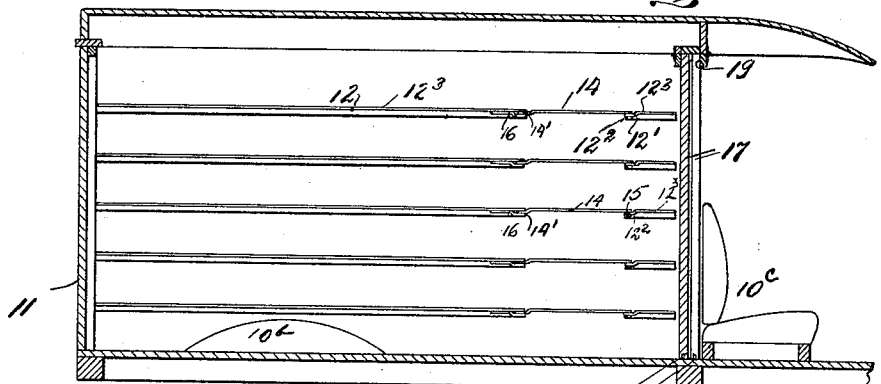
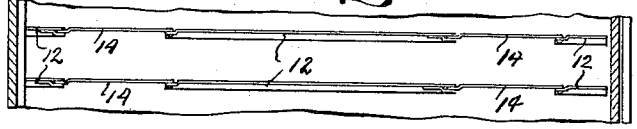
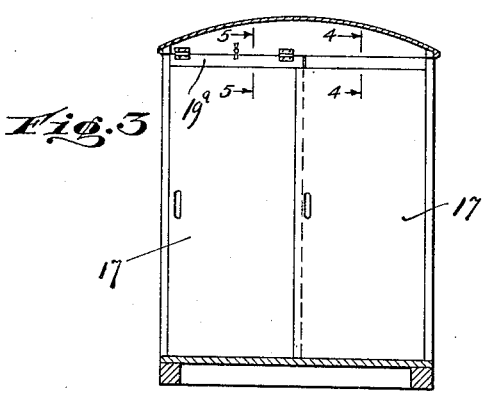
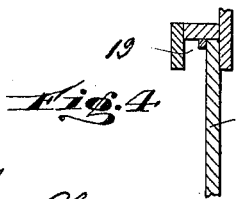
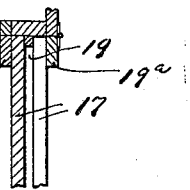
INVENTORS
Charles Brykczynski and
Julius Chmurzynski
BY
Max N. Ordmann
ATTORNEY.

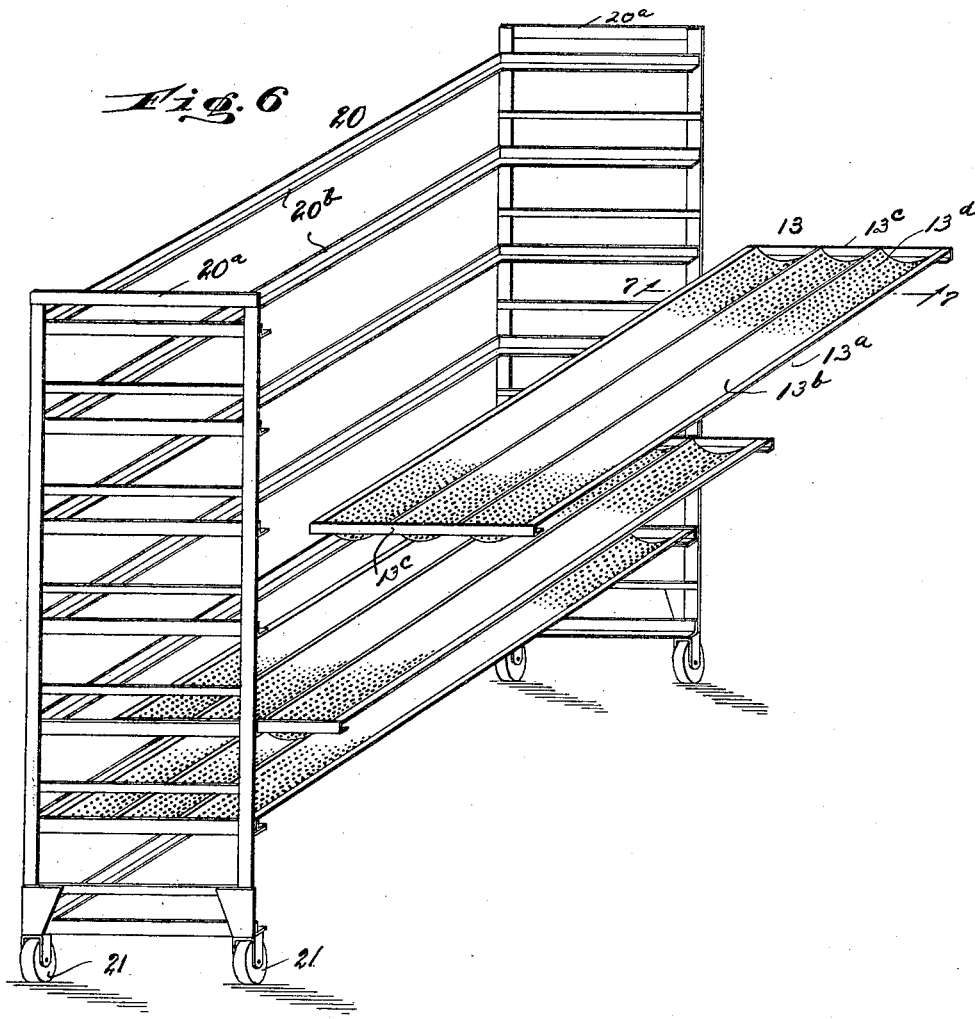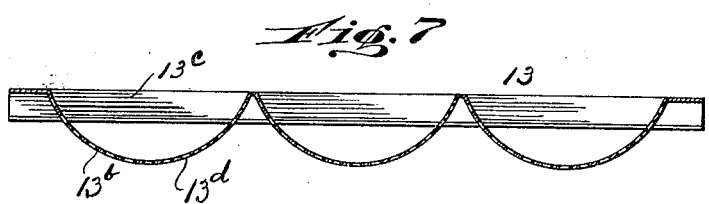

Patented Oct. 11, 1932

1,882,238

UNITED STATES PATENT OFFICE

CHARLES BRYKCZYNSKI, OF BROOKLYN, AND JULIUS CHMURZYNSKI, OF ASTORIA, NEW YORK

DELIVERY AND LOADING MEANS FOR BAKERY PRODUCTS OR THE LIKE

Application filed September 11, 1931. Serial No. 562,298.

The present invention relates to loading and delivery means for bakery products or the like.

In the delivery of such products from the bakery to the consumer, rapid and hygienic loading thereof into the delivery wagons is essential. Furthermore, for efficient delivery, the wagons themselves must be so constructed as to permit loading to full capacity. It is also essential that the wagon structure be such that the products can be handled in sanitary manner and that there be, therefore, ready access to all parts of the wagon interior both when the latter is loaded and unloaded.

Heretofore it has been customary to store bakers products in boxes, baskets or the like and placing the same on shelves or the like in the wagon, which for the purpose of ready access have been made collapsible or of the interlocking type. But such method and structure having been found to be objectionable for many reasons, particularly because unwieldy and inefficient.

While primarily this invention consists in the structure of the loading and the delivery means, the problem of transportation of the bakery products from the oven or baking room to the delivery wagons is also part of this invention.

It is one object of this invention to obviate said drawbacks in an effective simple manner.

It is a further object of this invention to provide a structure which can be applied to existing vehicles.

A still further object therefore, is the provision of simple and efficient means for facilitating the transportation of the bakery products from the baking room to the delivery wagon.

Still another object is to provide special holders or collectors for the bakery products, designed particularly for the convenient, sanitary and efficient handling of bread loaves, or the like.

With the above and other objects in view, our invention comprises the novel construction, combination and arrangement of elements to be hereinafter more fully described and shown and defined in the appended claims.

In the accompanying drawings which form part of this specification and in which similar reference characters denote corresponding parts:—

Fig. 1 is a perspective view of the body of a delivery wagon as seen from the rear end thereof, equipped with means for storing therein collectors of the bakery products or the like;

Fig. 2 is a vertical section on line 2—2 of Fig. 1;

Fig. 2a is a vertical section similar to Fig. 2 of a modified structure;

Fig. 3 is a front end view thereof;

Fig. 4 is a vertical section on line 4—4 of Fig. 3;

Fig. 5 is a vertical section on line 5—5 of Fig. 3;

Fig. 6 is a perspective view of portable support or rack for a plurality of collectors or troughs; and Fig. 7 is a cross section on line 7—7 of a collector or trough.

Referring now more in detail to the drawings and first to the structure shown in Figs. 1–5, 10 designates the body of a delivery wagon having at its rear end the usual hinged doors 11. Along the inner face 10$^a$ of each of the opposite side walls of the wagon are suitably fixed in superposed parallel position a plurality of longitudinally extending angle bars or members 12, the two opposite sets of said bars being arranged at suitable equal distances apart from one another and constituting runways for the collectors 13 on which the products are adapted to be stored in the wagon for delivery.

The collectors 13 as seen from Figs. 6 and 7 are in form of trays or troughs preferably of the shape shown, i. e. consisting of an elongated rectangular frame 13$^a$ and an undulated or corrugated supporting surface or bed 13$^b$ divided by the undulations longitudinally into several concaved compartments which in cross sections are adapted to substantially conform with the shape of a loaf of bread or the particular product for which it is to be used so that the latter may be conveniently stored in adjacent longitudinal rows in the said collector or trough 13. It will be noted that the pieces 13ᶜ of the frame 13ᵃ project beyond the lowermost point of the depression of each compartment and thus form rests or stops for the products at the front and rear ends of the troughs.

When unloaded the troughs can be placed on top of one another, the concave compartments of the superposed troughs engaging one another.

For the purpose of permitting air circulation the surface 13ᵇ may be perforated as at 13ᵈ. These troughs 13 when loaded with the products can be placed into the wagon like shelves to be supported on each pair of opposite iron bars or runways 12 and adjusted to lie adjacent to one another in horizontal rows extending throughout the length of the inner space of the delivery wagon.

The several sets or rows of troughs will be thus positioned in superposed manner slidably and removably bearing in shelf-like manner on the superposed pairs of runways or angle bars 12.

In order to facilitate the shifting of the troughs within the wagon from an upper pair of runways to a lower one and vice versa and thus afford easy access to or quick delivery of the products stored on a particular trough without the necessity of removing other troughs from the wagon the following construction is employed:

The angle bars 12 are provided each with a movable section 14 which according to the present embodiment are shown in form of hinged sections. To this end each angle bar has a cut away portion, preferably near the front end thereof. The front end of said cut away portion is formed with an L-shaped bend 12′, the horizontal portion 12² of which extends below the upper horizontal face 12³ of the angle bar or runway a distance substantially equal to the thickness thereof. This horizontal portion 12² serves as a rest for the movable sections 14 whose front end is attached thereto by a vertical pivot 15. This section 14 is of the same thickness as the horizontal portion of the angle bar so that when positioned on and pivoted to the part 12² of said bend 12′ its upper face will be perfectly even with the upper face of the iron bar. In length the pivoted section 14 is substantially equal to that of the cut away part of the angle bar 12. The rear end 14′ of said section is bent downwardly so as to engage the lower face of the horizontal leg of the angle bar 12. Fixed at the rear end of the cut-out portion of the lower face of the angle bar 12 is a bent arm 16 adapted to engage the lower face of the depressed part 14′ of the section 14 and support the latter in position of use in which the movable sections 14 will be perfectly even with the horizontal legs of the bars 12, so that the troughs 13 placed on opposite runways or bars 12 can be easily shifted along the latter from one end of the wagon to the other. The clearance between the ends of the cut-out portions is slightly larger than the total width of a trough 13, so that when the sections 14 of runways or bars 12 are turned on the pivots 15 an angle of 90° or more, the trough located over the movable section 14 can be readily passed through the opening formed from an upper to a lower set of runways, or vice versa.

This provision of such movable sections 14 is particularly important for wagons in which the wheels (not shown) of the wagon are countersunk in the side walls of the wagon and in which case the lower parts of the side walls of the wagon bulge inwardly as at 10ᵇ. These bulging parts form obstructions which take up considerable space. In order to economically utilize the entire space of the interior of the wagon for storing the products the sets of runways 12 must be arranged on each side wall as closely as possible to one another. Hence each of the lowermost runways if arranged close to the bottom may be cut up in two parts by the bulging portion 10ᵇ which will prevent the shifting of the troughs from the rear to the front end of the wagon and in fact make it difficult to position the troughs in the front part of the wagon. By the provision of the hinged sections 14 of the bars 12 this objection will be obviated, in that it is possible to easily position the trays onto and remove the same from the bottom of or lowermost set of runways by first swinging the corresponding hinged sections 14 of the adjacent set around their pivot, and transfer the particular trays from the upper or lower runways to the bottom or a lower or higher runway as the case may be.

It is also obvious that instead of providing each runway with one hinged section, there may be two or more such sections as shown in Fig. 2ᵃ.

To still more facilitate manipulation of the troughs in the wagon while loading and unloading or shifting said troughs without the necessity of exposing the products to rain or snow, we also provide access thereto through the front wall of the wagon. This access is had through doors 17 which in order not to interfere with the driver's seat 10ᶜ are made slidable instead of foldable. To this end the front doors 17 consist of two half-sections slidably mounted at their bottom on parallel rails 18 and on top in guide grooves 19 provided at the front end of the wagon. The outer walls 19ᵃ of said guide grooves are movable, either on hinges or pivots as shown in Fig. 5 in order to facilitate the removal of the door sections when it is desired to unload or load the troughs from the front rather than the rear of the wagon.

To transpose the troughs in the wagon on the different runways the door sections need not be removed but one or the other may be merely shifted from one side to the other, as indicated in dotted lines in Fig. 3.

For the transport of the troughs from the oven or baking room to the wagon a portable rack 20 supported on wheels 21 is employed. This rack comprises a U-shaped frame formed of two end pieces 20ª connected by a set of vertically superposed U-shaped angle bars 20ᵇ fixed thereto and which form supports or shelves for the troughs 13. These troughs are adapted to be positioned on and removed from said shelves through the open side of said rack and to bear on the shelves thereof with their end edges and one side edge.

A removable stanchion or post 22 is mounted at the rear of the wagon which serves to prevent the loaded troughs from slipping out of the wagon when the latter is loaded.

The use of our device is as follows:—

The breads or other bakery products as they come from the oven are stacked on the troughs or collectors 13 and the latter are placed upon the portable rack 20. The loaded rack is then rolled from the baking room to the delivery wagon. Here the troughs are individually removed from the racks and mounted on the respective pairs of angle bars in the wagon, first on the lower pair, then on the second pair, etc., until the entire wagon is filled. To load on the lower pair of angle bars in the front part of the wagon the movable sections 14 of the adjacent pair of angle bars are swung open and the trough lowered through the gap onto the lower pair of angle bars.

When arriving at a delivery point, the troughs to be delivered are individually removed from the wagon, emptied into the consumer's receptacle and replaced in the wagon.

By reason of their construction loaded troughs may be slipped over and rest in unloaded ones.

The movable portions 14 in the angle bars 12 permit troughs to be shifted from one set of runways to another within the truck without removing them from the latter. This affords the deliverer great ease of manipulation and facility of adjustment of the load as well as ready access to any particular trough.

The rack in width, height, and in the spacing and number of shelves thereof may be made to exactly correspond with the inner width and height of the vehicle and spacing and number of runways therein, so that the rack may be brought up close to the opened rear end of the vehicle and the troughs shoved from the rack onto the runways of the vehicle thereby avoiding the lifting of the troughs from the shelves of the truck and greatly facilitate loading.

It is obvious that various modifications may be made in the construction of the device without departing from the spirit of our invention and we therefore do not wish to restrict ourselves to the details of the constructions described and shown.

What we claim is:—

1. In a delivery vehicle, a plurality of horizontal pairs of parallelly extending runways, the individual runways of each pair being respectively mounted on opposite walls of the vehicle body for supporting collectors therebetween, each of said runways being provided with a removable section which when removed will leave a gap in the respective runway of sufficient dimensions to permit transfer of collectors from a pair of runways at one level to another pair of runways at a different level without removal of said collectors from said vehicle.

2. In a delivery vehicle, a plurality of horizontally mounted pairs of parallelly extending runways at various levels therein for supporting collectors therebetween, each of said runways being provided with a removable section which when removed leaves a gap in its respective runway of sufficient dimensions to permit transfer of collectors from a pair of runways at one level to another pair at a different level without removal of said collectors from said vehicle.

3. In a delivery vehicle, a plurality of horizontally mounted pairs of parallelly extending runways at various levels therein for supporting collectors therebetween, each of said runways being provided with a pivoted section which may be moved horizontally about its pivot point and which is so admeasured in length that it leaves a gap in its respective runway of sufficient dimensions to permit transfer of collectors from a pair of runways at one level to another pair at another level without removal of said collectors from said vehicle.

4. In a vehicle having a delivery body, a plurality of horizontal pairs of parallelly extending runways, the individual runways of each pair being mounted on opposite side walls of said body for supporting an article tray therebetween, each of said runways being provided with a pivoted section which may be moved about its pivot point to leave a gap in said runway and which is so admeasured in length that when moved said gap in each runway is of sufficient dimensions to permit transfer of trays from a pair of runways at one level to another pair at another level without removal of said collectors from said vehicle.

5. In a vehicle having a delivery body, a plurality of longitudinally superposed pairs of horizontally extending angle bars, the members of each pair being mounted respectively to opposite side walls of said body and serving as runways to receive article trays, each of said angle bars being provided with a cut away portion so admeasured as to permit passage therethrough of a tray whereby said tray may be shifted from a pair of angle bars at one level to a pair at another level without being removed from said vehicle body and a pivoted angle bar section for closing each gap and means for mounting said sections so that when in place the top surface of each runway will be even throughout its length.

In testimony whereof we affix our signatures.

CHARLES BRYKCZYNSKI.
JULIUS CHMURZYNSKI.